United States Patent [19]

Schaar et al.

[11] 3,955,987

[45] May 11, 1976

[54] INTUMESCENT COMPOSITIONS AND SUBSTRATES COATED THEREWITH

[75] Inventors: John L. Schaar; James A. Ellard; John Mann Butler, all of Dayton, Ohio

[73] Assignee: Monsanto Research Corporation, St. Louis, Mo.

[22] Filed: Apr. 19, 1974

[21] Appl. No.: 462,273

[52] U.S. Cl. ............................. 106/15 FP; 106/162; 106/177; 106/186; 106/193 J; 106/197 C; 106/217; 252/7; 252/8.05; 252/8.1; 260/DIG. 24; 427/324; 427/325; 427/326; 428/920; 428/921

[51] Int. Cl.² ....................... C09D 5/18; C09K 3/28

[58] Field of Search .................... 106/15 FP, 16–18; 117/136–138; 252/2, 3, 4, 5, 6, 6.5, 7, 8.1; 428/920, 921

[56] References Cited

UNITED STATES PATENTS

| | | | |
|---|---|---|---|
| 1,856,756 | 5/1932 | Frigiola | 106/15 FP |
| 2,650,206 | 8/1953 | Stock | 106/15 FP X |
| 2,757,102 | 7/1956 | Wooding et al. | 106/15 FP X |
| 2,901,428 | 8/1959 | Schulenburg | 252/7 |
| 3,513,114 | 5/1970 | Hahn et al. | 106/15 FP X |

FOREIGN PATENTS OR APPLICATIONS

| | | | |
|---|---|---|---|
| 755,551 | 8/1956 | United Kingdom | 106/15 FP |

Primary Examiner—Joan E. Welcome
Attorney, Agent, or Firm—Bruce Stevens

[57] ABSTRACT

Intumescent compositions are described which when deposited on a substrate protect the substrate against heat and fire damage for an appreciable time, and these compositions are readily removed from the substrate by water washing or water scrubbing both before and after intumescing. Another advantage of these compositions is that they give off very little smoke when exposed to heat and fire. The most effective of these compositions comprise monoammonium phosphate and/or diammonium phosphate as a heat- and fireproofing agent, urea and/or cyanoguanidine (dicyandiamide) as a gas forming or gas generating agent to promote the intumescence, sucrose (sugar) together with the phosphate to promote initial intumescence at low temperature and titanium dioxide as a heat-reflecting agent. Certain possible alternatives to the compounds named above are also named.

10 Claims, 1 Drawing Figure

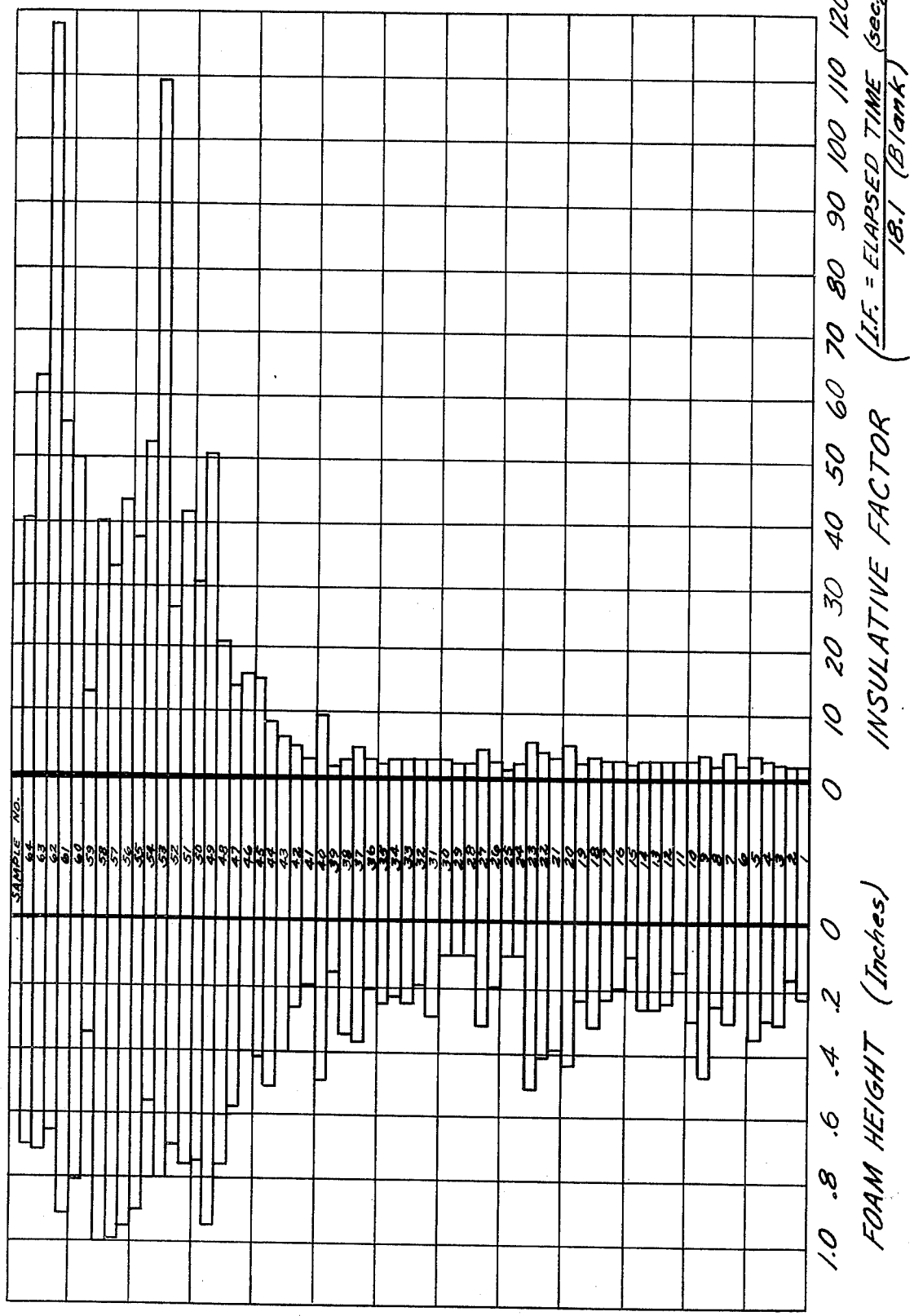

INTUMESCENT COMPOSITIONS AND SUBSTRATES COATED THEREWITH

BACKGROUND OF THE INVENTION

1. Field of the Invention

Heat- or Fireproofing Coatings.

2. Description of the Prior Art

There is a large body of prior art in the field of the invention and two of the more pertinent prior art references are the following patents:

U.S. Pat. No. 2,901,428 describes fire extinguishing intumescent compositions which may be applied to the fire. These are solid dry chemical fire extinguishing compositions which may also be used as suspensions in water or noncombustible organic liquids. The dry powders include foam forming substances such as phosphoric acids or boric acids and their salts plus finely divided resins which, for example, can be urea formaldehyde resins. Ammonium salts of phosphoric acid are suggested as being especially good. It is stated that in some instances it is desirable to increase the carbon content of the compositions by incorporating carbohydrates, such as starch, sugar, dextrin or cellulosic compounds, or proteinaceous materials, such as glue, casein, gelatin and other glue-like proteins. Also, the compositions may contain inorganic crust forming materials, such as asbestos flour, kieselguhr, gypsum, barite and the like. It is further stated that sodium bicarbonate which is commonly contained in dry chemical fire extinguishers can be included in the compositions and in addition certain other optional materials are suggested. For the dry powder fire extinguishing compositions $CO_2$ under pressure can be used as a propellant and if in liquid form the composition can be sprayed.

U.S. Pat. No. 3,513,114 describes intumescent coating compositions to provide permanent protective coatings. These compositions are aqueous dispersions comprising water, a polyvinyl acetate latex resin, a solvent plasticizer, a carbonific and a substantially water insoluble ammonium polyphosphate. The carbonifics are urea formaldehyde resins, but the patent goes on to say that non-resinous carbonifics may be used with or in place of the resinous, and these non-resinous carbonifics may include carbohydrates, modified starches, and similar substances, a water dispersible protein and a gelatin or casein or a polyhydric compound such as hexitols (mannitol), penitols (arabitol), monopentaerythritol, the poly-pentaerythritols and solid chlorinated paraffin wax. In addition, the patent says, improved results can oftentimes be obtained from adding to the non-resinous carbonific an amine compound such as dicyandiamide, urea, melamine, dimethyl urea, glycerine and the like with dicyandiamide and melamine being preferred. A disadvantage of these coatings is that due to the substantial organic content, a substantial amount of smoke is produced when these coatings are exposed to heat and fire. Also the patent states that various other additives may be incorporated into the composition such as dyes, pigments, swelling agents, wetting agents, dispersing agents, fungicides or bactericides and the like.

SUMMARY OF THE INVENTION

Intumescent compositions are described which when deposited on a substrate protect the substrate against heat and fire damage for an appreciable time, and these compositions are readily removed from the substrate by water washing or water scrubbing both before and after intumescing. Another advantage of these compositions is that they give off very little smoke where exposed to heat and fire. The most effective of these compositions comprise monoammonium phosphate and/or diammonium phosphate as a heat- and fireproofing agent, urea and/or cyanoguanidine (dicyandiamide) as a gas forming or gas generating agent to promote the intumescence, sucrose (sugar) together with the phosphate to promote initial intumescence at low temperature and titanium dioxide as a heat-reflecting agent. Certain possible alternatives to the compounds named above are also named.

BRIEF DESCRIPTION OF THE DRAWING

The drawing is a graphical presentation of the Insulative Factor (IF) and Foam Height in inches for the dry powder formulations of the invention and some related formulations.

DETAILED DESCRIPTION

An experimental program was initialed to develop a low-cost, water-suspendible, phosphate-based, sprayable, temporary intumescent coating. Compositions must function at low temperature, low heat-flux on a wide variety of substrates, and be readily removed by water either before or after fire contact.

The first step in the program was development of a unique dry-powder mixture capable of initiating at low temperatures (140°–175°C.; 285°–350°F.) to give high volume intumescence coupled with extended flame durability at (450°–950°C.), and the second incorporating the dry-powder formulation into a stable, high solids content, aqueous suspension capable of adhering to vertical or horizontal surfaces when delivered from pressurized spray equipment.

The ultimate goal of any intumescent system, either dry-powder or aqueous suspension, would be insulative effectiveness under all fire conditions. We have not achieved this goal; nevertheless, the practical results of this study indicate a simple, unique combination of ingredients has been developed which intumesce at low temperature and gives a high degree of total insulative effectiveness. In particular samples 49 through 64, Table I and the Figure, indicate formulations of ingredients capable of consistently expanding at low, moderate and high heat-fluxes to 40–50 times the original volume of the dry-powder. The foam increased heat reflection and reduced heat absorption sufficiently to retard heat flow to the substrate to an average level of 2.3 percent compared to an unprotected metal surface. Sample 49 has shown remarkable intumescent quality on such diversified materials or substrates as wood, synthetic carpet, glass, plastic bottles, aluminum and galvanized steel sheet when applied as aqueous suspensions to the substrate by spraying, painting on with a brush, dipping the substrate in the suspension and the like.

Intumescent coatings are characterized by their ability to form a foamed insulative char in the presence of heat or flame. Conventional commercial coatings require a combination of three components: polyol, inorganic acid, and gas generator. A considerable amount of research effort has been expended to incorporate these materials, which possess a marked degree of water sensitivity, into permanent type paints. The permanent type intumescent coating adds the additional problem of developing a binder which will not affect the foaming of the intumescent agents and still impart all the qualities of a good paint.

Exposing a good intumescent coating to intense heat initiates a number of chemical and physical changes. Initially, a black foam is produced by the attack of the inorganic acid on the polyol. This esterification reaction is further promoted by organic amides and the initial expansion of the foam is accompanied by the rapid loss of gas. The soft foam near the substrate is transformed to a rigid foam as heating is continued, and further loss of nitrogen and hydrogen is detected as the carbon content is slowly oxidized away. The bulk of the soft foam is a pigmented phosphorus glass, and as heating intensity increases a loss of phosphorus is observed at 660°C. as excess phosphorus is distilled off as the pentoxide. Continued heating (750°–950°C.) slowly converts the pigmented glass foam to nonvolatile refractory compositions with reticulated foam structure, which acts as a highly effective refractory insulator. Oxides of antimony, zirconium and titanium have been effective as heat reflecting agents and are usually evidenced by a characteristic white powdery residue on the surface of the char. The structure of these chars has been investigated by elemental analysis and microscopic examination, (J. A. Ellard, "Performance of Intumescent Fire Barriers," paper presented to the American Chemical Society, Division of Organic Coatings and Plastics, Dallas Meeting, 165th, Vol. 33, No. 1, pages 531–543, April 1973).

Our approach to a useful fire retardant product was not the conventional permanent intumescent paint, but a temporary intumescent coating that can be delivered either as a dry-powder or as a high-solids, aqueous suspension. There are already a number of commercially acceptable, permanent intumescent coatings, but we realized that there is a definite need for a low-cost, water-dispersible, phosphate-based temporary coating which would have the added advantage of low heat-flux intumescence, and in addition, be readily removed by water either before or after fire contact. A further advantage of our coatings is that they give off very little smoke when exposed to heat and fire. Such a versatile composition would be useful as a coating for roofs, buildings and storage tanks that might be near or in the path of a fire.

In order to obtain the desired phosphate glass structure, six chemical forms were evaluated, either singly or in combination. Phosphate source materials were selected from ammonium polyphosphate (PHOSCHEK P-30); ammonium phosphate, dibasic (DAP); metaphosphoric acid ($H_3PO_4$); hypophosphorus acid; potassium phosphate, monobasic; and ammonium phosphate, monobasic (MAP). Samples 1–42, in Table I, used the first five phosphorous-containing materials. The phosphorus compounds were used in combination with melamine or cyanoguanidine as the nitrogen-containing blowing agent, and such varied polyol sources as: dipentaerythritol (DPE); starch; inositol; dextrose; pentaerythritol (PE); tripentaerythritol (TPE); and sucrose. Samples 4, 6, 8, 11, 13, 15, 17, 19 and 22, also contained CHLOROWAX-70 (Diamond Alkali Co.) which is a 70 percent-chlorinated paraffin, and is purported to be an effective flame retardant additive. Our experiments indicate this chlorinated paraffin is actually a deterrent to efficient foam expansion and reduces the insulative effectiveness of our formulations. Certain metal oxides are a practical method for reducing emissivity of foams and increasing heat reflectance, as is indicated in the Ellard reference, supra. We have chosen titanium-dioxide (du Pont R-900) for economic factors and it improves dry-powder flow characteristics. It was not until sucrose (commercially available beet sugar, granulated) was used as a polyol source (sample 40) that a really significant insulative factor was obtained for any of these samples (1–42). In our tests using dry-powder samples, a blank value of 18.1 seconds obtained using an uncoated planchet was divided into the elapsed time in seconds (ET), for the back-face surface of a planchet to reach 400°F., while protected by a one gram sample. The ET/18.1 is reported as the insulative factor (IF), which was useful in determining the effectiveness of formula ingredient ratios. The discovery that granulated sugar (sample 40) increased the insulative effectiveness almost ten-fold (IF = 9.9) was a major breakthrough in our formulation experiments.

An examination of the chemical/physical properties of the six phosphorus containing compounds under investigation, clearly indicated that MAP/sucrose combinations would be the most logical approach to an effective intumescent formulation.

| | |
|---|---|
| Sucrose | m.p. 160–186°C. |
| MAP, [$NH_4$]$H_2PO_4$ | m.p. 156°C.; pH (1% solution): 4.5–5.2 |
| DAP, [$NH_4$]$_2HPO_4$ | m.p. 190°C.; pH (1% solution): 7.5–8.0 |

The choice of MAP was further augmented by the awareness that the closeness of the polyol melting point to the melting point of the acid accelerates the esterification of the polyol at the time of optimum acid catenation. The viscous melt of the MAP/sucrose mixture encourages the entrainment of escaping gases into the rapidly forming soft foam. This hypothesis was substantiated in sample 43, where a 1:1 (w/w) mixture of MAP/sucrose (granulated) produced an IF = 6.2. A 20 percent increase in insulative effectiveness (IF = 8.5) and foam height was obtained by substituting commercially available confectioners sugar (3 percent cornstarch added as an anticaking agent) for granulated sugar in sample 44. The superiority of confectioners sugar was definitely established by a comparison of the IF values and foam height measurements in samples 45–46 and samples 47–48. The expertise developed in samples 43 through 48 produced sample 49. This four component system containing MAP:cyanoguanidine:confectioners sugar:titanium dioxide in a 5:2:1:1 ratio yielded an IF = 50.9 and a foam height = 0.95 inches high (approximately 50-fold increase in volume). Samples 49, 50, 54 and 55 indicated that this ratio was the most effective combination of ingredients when comparing IF, foam height and initial intumesce.

Experimental data (Table I and the Figure) indicated a direct relationship of IF value and foam height. Samples which produced data for foam height <0.5 inch and IF<25 were excluded from further consideration. The average values for acceptable samples (49–64) excluding 53 and 62 were IF = 42.6 and foam height = 0.84 inch.

Several methods of mixing the dry ingredients were evaluated. The best method required the micronization of the crystalline MAP to <20 mesh (0.033) inch by ball-milling. Cyanoguanidine should be screened prior to formulation mixing to <20 mesh. Storage of these materials was troublesome as they agglomerate in a very short time. In the preparation of larger sized samples, a twin-cone V-blender gave uniform mixing while minimizing the dusting of the product during handling. The cones of the V-blender were constructed of "Plexiglas" and visual observation of the mixing qualities were an added advantage.

Sample 53, a water-granulated product, had an exceptionally high IF value (109.3). Samples 52, 58 and 60 attempted to duplicate and establish the superiority of granulation over routine mixing techniques. The results were negative and perhaps sample 53 was an unexplainable anomaly.

Experimentally sample 62, a 5:2:1:1 mixture of MAP:urea:confectioners sugar:titanium dioxide had the best IF value (117.9) of all the samples tested. In an aqueous suspension, sample 62 failed to intumesce in a contiguous foam and for the second phase of this study sample 49 was greatly superior. However, the utilization of urea as a nitrogen blowing agent should not be overlooked in a dry-powder application.

Samples 65, 66 and 67 (see Table I) were comparison tests on commercial dry-powder fire extinguisher products. Commercial Product No. 1 was the only product capable of intumescence. Based on our test system, all three products would have been rejected due to poor foam height and low IF values. Since we did not fully investigate a dry-powder product, samples 65, 66 and 67 all had superior flow modulus to our dry-powder formulation.

The tolerance of open-beaker samples of sample 49 (5:2:1:1 ratio) to a wide range of constant relative humidity levels was as follows:

| Period | 20%-RH | 40%-RH | 60%-RH | 80%-RH | 95%-RH |
|---|---|---|---|---|---|
| 18 hrs. | + | + | + | (±) | − |
| 48 hrs. | + | + | + | (±) | − |
| 2 months | + | + | + | − | = |

(+) : free flowing; little difference from original sample
(±) : lumpy, light crust on surface; free flowing powder underneath
(−) : heavy surface caking; little or no free flowing powder
(=) : aqueous condensate in beaker; intractable mass; surface liquid present

DRY POWDER INTUMESCENT COMPOSITIONS

In prior exploratory work, compositions of phosphoric acid and dicyandiamide (cyanoguanidine) had exhibited interesting intumescent properties. A short term study on the nature of the compositions formed from dicyandiamide with ortho or meta phosphoric acid, phosphorous acid, hypophorous acid and diammonium phosphate in various combinations exhibited additional interesting intumescent properties. (See Ellard, supra) At the start of this program, the intumescence of each dry powder sample was evaluated by heating the surface of a sample with a propane torch or inverted Meeker burner. Temperatures from these heat sources were of the order 450°–1200°C. and were highly erratic.

A. SCREENING WITH THE MONSANTO FLAT FLAME BURNER

An improved test system based on a flat flame burner, which gives stable, uniform, reproducible flames over a wide range of flame temperatures and energy outputs was then used. A flame temperature of 900°C. and a heat flux of 15.2 cal/cm$^2$/sec was selected to evaluate the effectiveness of each formulation.

In this burner, premixed fuel (2.0 SCFH)* and air (18.0 SCFH) are burned in a thin layer, about 1 inch diameter by 1 mm thick, above a cooled porous metal disc which prevents flashback.

*Type B, Manufactured Cylinder Gas, Matheson Gas Products

B. APPARATUS

The geometry of the test apparatus is that of the Monsanto 2-foot flame tunnel, except that the window has been omitted, and the flat flame burner is used and locked in a horizontal position 1.1 inches from the surface of the sample. A one gram sample was spread as evenly as possible over a two-inch diameter by ⅛ inch thick concentrically ringed stainless-steel planchet (Nuclear Accessories Inc, No. 20-255). The planchet was mounted and held in a two-piece asbestos/transite fixture. The bottom section was a 3 ⅜ inch (wide) × 4 inches (long) × 1 inch (thick) asbestos block with a 2 inch diameter by 3/16 inch deep center-bore to firmly hold the planchet. The 3/16 inch transite cover was center-bored (1.95 inches) to the above dimensions and the two sections were held in place by 2-diagonal, vertically drilled ¼ inch ss dowel pins. An iron constanan thermocouple was affixed to the backface of the planchet with glass-cloth adhesive tape. The thermocouple ran diagonally through the block in such a manner to minimize the effect of reflected heat due to the insulative qualities of the asbestos/transite mounting fixture. The test involved visual observation of the elapsed time for the initial appearance of intumescence, measurement of the residual foam height, and recording the time for the back-face temperature to reach 400°F. (205°C.). Table I describes the raw data collected by this test method for most of the dry powders formulated, and one outstanding formulation, No. 49, was the basis for extensive aqueous suspension studies.

C. PREPARATION OF DRY-POWDER FORMULATIONS

Each of the ingredients evaluated were of a crystalline nature and the maximum allowable particle size for this study was 20-mesh (0.033 inch). If the individual ingredient was aggregated, it was ground using a mortar and pestle and screened to pass 20-mesh. Each ingredient was weighed ad addendum into a 1½ × 3 ⅜ inch (4-ounce) glass jar and the collective rescreened through a 20-mesh screen. The formulation was returned to the jar, closured, and rolled on a small jar-mill for 10–15 minutes. Ten to 25 g. samples were prepared initially with a one gram aliquot of each formulation evaluated in the 2' flame tunnel as previously described. When it became necessary to prepare larger size samples, ninety and nine-hundred gram batches were prepared by using 1-quart and 1-gallon wide mouth jars on a larger jar-mill.

Two methods of mixing the dry ingredients of sample 49 were necessary in preparing 3.6 Kg size quantities.

A. Five gallon capacity Bucket mixer with an adjustable scraper blade gave mixing action similar to a large cement mixer. (KOL, Inc., 2323 Ellis Avenue, St. Paul, Minn. 55114). Used with a polyethylene (PE) bucket liner.

B. Twin-cone V-Blender, cones composed of ¼ inch Plexiglas, Cone turned at 24 rpm, approximate capacity: 0.4 cu. ft.

Certain granulation techniques were carried out on Sample 49 formulation in an effort to improve the insulative and intumescent qualities. This was done by introducing the necessary quantity of solvent, water or alcohol, to sufficiently aggregate the above formulation. The moistened system is then forced through a 20-mesh screen, and screened material either air or oven-dried. The dried aggregates are further pulverized by standard methods to pass a 40-mesh screen.

The experimental work on the dry powders is summarized in Table I which follows:

TABLE I

DRY-POWDER FORMULATIONS EVALUATED IN TWO-FOOT TUNNEL

| SAMPLE | PHOSPHORUS CONTAINING MATERIALS | NITROGEN CONTAINING MATERIALS | POLY-HYDROXY MATERIALS | TITANIUM DIOXIDE | MISCELLANEOUS MATERIALS | TIME TO OBSERVE INITIAL INTUMESCENCE, (in secs.) | ELAPSED TIME (ET) (seconds) FOR BACK-FACE TEMP. TO REACH 400°F | Insulative Factor (ET: 18.1) | Foam Height inches |
|---|---|---|---|---|---|---|---|---|---|
| 1 | Phos-chek P-30: 36.8% | Cyanoguanidine: 63.2% | — | — | — | 3.0 | 31.8 | 1.7 | |
| 2 | Phos-chek P-30: 35.5% | Cyanoguanidine: 60.9% | — | 3.6% | — | 3.0 | 35.1 | 1.9 | .175 |
| 3 | Phos-check P-30: 35.5%; DAP(1): 3.6% | Cyanoguanidine: 60.9% | — | — | — | 3.0 | 37.4 | 2.1 | .310 |
| 4 | Phos-check P-30: 49.0% | Melamine: 16.5% | DPE(2): 8.0% | 16.5% | Chlorowax-70: 10.0% | 4.0 | 48.4 | 2.8 | .300 |
| 5 | Phos-check P-30: 52.9% | Melamine: 17.3% | DPE(2): 12.5% | 17.3% | — | 3.0 | 68.4 | 3.8 | .350 |
| 6 | $KH_2PO_4$: 49.0% | Cyanoguanidine: 16.5% | Starch: 8.0% | 16.5% | Chlorowax-70: 10.0% | 2.9 | 36.7 | 2.0 | .200 |
| 7 | $KH_2PO_4$: 52.9% | Cyanoguanidine: 17.3% | Starch: 12.5% | 17.3% | — | 4.4 | 74.0 | 4.1 | .305 |
| 8 | $KH_2PO_4$: 49.0% | Cyanoguanidine: 16.5% | DPE(2): 8.0% | 16.5% | Chlorowax-70: 10.0% | 2.4 | 34.2 | 1.9 | .250 |
| 9 | $KH_2PO_4$: 52.9% | Cyanoguanidine: 17.3% | DPE(2): 12.5% | 17.3% | — | 4.2 | 63.1 | 3.5 | .480 |
| 10 | DAP(1): 3.6% Meta-$H_3PO_4$: 35.5% | Cyanoguanidine: 60.9% | — | — | — | 2.3 | 39.2 | 2.2 | .300 |
| 11 | Melamine Phosphate: 65.5% | — | DPE(2): 8.0% | 16.5% | Chlorowax-70: 10.0% | 5.1 | 39.8 | 2.2 | .150 |
| 12 | Melamine Phosphate: 73.0% | — | DPE(2): 9.0% | 18.0% | — | 3.2 | 48.5 | 2.7 | .240 |
| 13 | Phos-chek P-30: 49.0% | Melamine: 16.5% | Inositol: 8.0% | 16.5% | Chlorowax-70: 10.0% | 3.8 | 43.1 | 2.4 | .250 |
| 14 | Phos-chek P-30: 55.0% | Melamine: 18.0% | Inositol: 9.0% | 18.0% | — | 2.5 | 46.5 | 2.6 | .250 |
| 15 | Phos-chek P-30: 49.0% | Melamine: 16.5% | Dextrose: 8.0% | 16.5% | Chlorowax-70: 10.0% | 2.3 | 35.5 | 1.9 | .100 |
| 16 | Phos-check P-30: 55.0% | Melamine: 18.0% | Dextrose: 9.0% | 18.0% | — | 3.2 | 42.7 | 2.4 | .200 |
| 17 | Phos-chek P-30: 49.0% | Melamine: 16.5% | PE(3): 8.0% | 16.5% | Chlorowax-70: 10.0% | 3.2 | 47.0 | 2.6 | .230 |
| 18 | Phos-chek P-30: 55.0% | Melamine: 18.0% | PE(3): 9.0% | 18.0% | — | 3.1 | 60.5 | 3.3 | .320 |
| 19 | Phos-chek P-30: 49.0% | Melamine: 16.5% | TPE(4): 8.0% | 16.5% | Chlorowax-70: 10.0% | 2.3 | 48.2 | 2.7 | .240 |
| 20 | Phos-chek P-30: 55.0% | Melamine: 18.0% | TPE(4): 9.0% | 18.0% | — | 2.3 | 88.9 | 4.9 | .430 |
| 21 | DAP(1): 3.4% Meta-$H_3PO_4$: 33.1 | Cyanoguanidine: 56.8% | DPE(2): 6.7% | — | — | 2.1 | 59.9 | 3.3 | .400 |
| 22 | Phos-chek P-30: 24.5%; Meta-$H_3PO_4$: 17.7%; DAP(1): 1.8% | Melamine: 8.3% Cyanoguanidine: 30.5% | PE(3): 4.0% | 8.3% | Chlorowax-70: 5.0% | 2.2 | 73.2 | 4.0 | .410 |
| 23 | Phos-chek P-30: 27.5%; Meta-$H_3PO_4$: 17.7%; DAP(1): 1.8% | Melamine: 9.0% Cyanoguanidine: 30.5% | PE(3): 4.5% | 9.0% | — | 2.9 | 97.5 | 5.4 | .520 |
| 24 | $H_3PO_2$: 39.4% | Cyanoguanidine: 60.0% | — | — | — | 7.0 | 37.6 | 2.1 | .520 |
| 25 | $H_3PO_3$: 49.4% | Cyanoguanidine: 50.6% | — | — | — | 2.5 | 31.9 | 1.7 | .100 |
| 26 | Meta-$H_3PO_4$: 36.8% | Cyanoguanidine: 63.2% | — | — | — | 4.0 | 44.2 | 2.4 | .200 |
| 27 | Meta-$H_3PO_4$: 29.9% 85%-$H_3PO_4$: 0.3% | Cyanoguanidine: 51.4% | Water: 18.3% | — | — | 3.0 | 76.9 | 4.2 | .320 |
| 28 | Meta-$H_3PO_4$: 28.3% | Cyanoguanidine: 48.6% | Water: 20.2% | 2.9% | — | 2.0 | 38.4 | 2.1 | .100 |
| 29 | Meta-$H_3PO_4$: 35.5% | Cyanoguanidine: 60.9% | — | 3.6% | — | 2.5 | 33.7 | 1.9 | .100 |
| 30 | Meta-$H_3PO_4$: 35.4% 85%-$H_3PO_4$: 0.4% | Cyanoguanidine: 60.6% | — | 3.6% | — | 2.2 | 41.3 | 2.3 | .100 |
| 31 | Meta-$H_3PO_4$: 35.5% DAP(1): 3.6% | Cyanoguanidine: 60.9% | — | — | — | 2.1 | 39.3 | 2.2 | .300 |

TABLE I-continued

DRY-POWDER FORMULATIONS EVALUATED IN TWO-FOOT TUNNEL

| SAMPLE | PHOSPHORUS CONTAINING MATERIALS | NITROGEN CONTAINING MATERIALS | POLY-HYDROXY MATERIALS | TITANIUM DIOXIDE | MISCELLANEOUS MATERIALS | TIME TO OBSERVE INITIAL INTUMESCENCE, (in secs.) | ELAPSED TIME (ET) (seconds) FOR BACK-FACE TEMP. TO REACH 400°F | Insulative Factor (ET: 18.1) | Foam Height inches |
|---|---|---|---|---|---|---|---|---|---|
| 32 | Meta-$H_3PO_4$: 34.3% DAP(1): 3.5% | Cyanoguanidine: 58.7% | — | 3.5% | — | 3.0 | 47.7 | 2.6 | .200 |
| 33 | Meta-$H_3PO_4$: 34.2% 85%-$H_3PO_4$: 0.3% DAP(1): 3.5% | Cyanoguanidine: 58.5% | — | 3.5% | — | 3.0 | 50.2 | 2.8 | .250 |
| 34 | DAP(1): 44.0% | Cyanoguanidine: 56.0% | — | — | — | 3.0 | 47.8 | 2.6 | .225 |
| 35 | Meta-$H_3PO_4$: 35.5% DAP(1): 3.6% | Cyanoguanidine: 60.9% | — | — | — | 3.0 | 34.3 | 1.9 | .250 |
| 36 | Phos-chek P-30: 13.8%; Meta-$H_3PO_4$: 8.8%; DAP(1): 0.9% | Cyanoguanidine: 15.2%; Melamine: 4.5% | PE(3): 2.3% | 4.5% | Vermiculite <40 mesh: 50.0% | 2.1 | 49.9 | 2.8 | .200 |
| 37 | Phos-chek P-30: 27.5%; Meta-$H_3PO_4$: 17.7%; DAP(1): 1.8% | Cyanoguanidine: 30.5%; Melamine: 9.0% | TPE(4): 4.5% | 9.0% | — | 3.2 | 82.2 | 4.5 | .375 |
| 38 | Meta-$H_3PO_4$: 30.1% DAP(1): 3.4% | Cyanoguanidine: 56.7% | TPE(4): 6.7% | — | — | 2.3 | 44.6 | 2.5 | .350 |
| 39 | $KH_2PO_4$: 43.3% DAP(1): 3.2% | Cyanoguanidine: 53.5% | — | — | — | 3.2 | 23.3 | 1.3 | .150 |
| 40 | Phos-chek P-30: 44.4% | Melamine: 14.5% | DPE(2): 16.9% Sugar-gran: 9.7% | 14.5% | — | 2.4 | 179.3 | 9.9 | .490 |
| 41 | Phos-chek P-30: 40.4% | Melamine: 13.2% | Sugar-gran: 8.8% DPE(2): 15.4% | 13.2% | — | 3.4 | 50.1 | 2.8 | .190 |
| 42 | Phos-chek P-30: 40.4% | Melamine: 13.2% | Sugar-gran: 8.8% DPE(2): 15.4% | 13.2% | — | 2.2 | 80.6 | 4.5 | .270 |
| 43 | MAP(5): 50.0% | — | Sugar-gran: 50.0% | — | — | 2.3 | 112.8 | 6.2 | .400 |
| 44 | MAP(5): 50.0% | — | Sugar-Conf.: 50.0% | — | — | 1.9 | 153.9 | 8.5 | .510 |
| 45 | MAP(5): 62.5% | Cyanoguanidine: 25.0% | Sugar-gran: 12.5% | — | — | 3.4 | 279.9 | 15.5 | .420 |
| 46 | MAP(5): 62.5% | Cyanoguanidine: 25.0% | Sugar-Conf.: 12.5% | — | — | 2.6 | 292.8 | 16.2 | .400 |
| 47 | MAP(5): 5.0% | Cyanoguanidine: 20.0% | Sugar-gran: 10.0% | 20.0% | — | 4.5 | 254.1 | 14.0 | .575 |
| 48 | MAP(5): 50.0% | Cyanoguanidine: 20.0% | Sugar-Conf.: 10.0% | 20.0% | — | 2.3 | 383.0 | 21.2 | .760 |
| 49 | MAP(5): 55.6% | Cyanoguanidine: 22.2% | Sugar-Conf.: 11.1% | 11.1% | — | 2.4 | 920.5 | 50.9 | .950 |
| 50 | MAP(5): 55.8% | Cyanoguanidine: 23.5% | Sugar-Conf.: 11.8% | 5.9% | — | 10.2 | 552.5 | 30.5 | .750 |
| 51 | MAP(5): 55.6% | Cyanoguanidine: 22.2% | Sugar-Conf.: 11.1% | 11.1 | 90.0 g batch of Sample 49 | 4.2 | 744.2 | 41.1 | .760 |
| 52 | MAP(5): 55.6% | Cyanoguanidine: 22.2% | Sugar-Conf.: 11.1% | 11.1% | EtOH granulated | 2.4 | 481.0 | 26.6 | .690 |
| 53 | MAP(5): 55.6% | Cyanoguanidine: 22.2% | Sugar-Conf.: 11.1% | 11.1% | $H_2O$ granulated | 2.1 | 1978.1 | 109.3 | .810 |
| 54 | MAP(5): 52.6% | Cyanoguanidine: 21.1% | Sugar-Conf.: 10.5% | 15.8% | — | 2.3 | 947.3 | 52.3 | .750 |
| 55 | MAP(5): 57.1% | Cyanoguanidine: 22.9% | Sugar-Conf.: 11.4% | 8.6% | — | 6.4 | 506.3 | 27.9 | .900 |
| 56 | MAP(5): 55.6% | Cyanoguanidine: 22.2% | Sugar-Conf.: 11.1% | 11.1% | 900 g batch of Sample 49 | 7.6 | 782.0 | 43.2 | .950 |
| 57 | DAP(5): 55.6% | Cyanoguanidine: 22.2% | Sugar-Conf.: 11.1% | 11.1% | — | 11.2 | 593.0 | 32.8 | 1.000 |
| 58 | MAP(5): 55.6% | Cyanoguanidine: 22.2% | Sugar-Conf.: 11.1% | 11.1% | 900 g batch $H_2O$ granulated | 2.3 | 725.3 | 40.1 | 1.050 |
| 59 | MAP(5): 55.6% | Cyanoguanidine: 22.2% | Sugar-Conf.: 11.1% | 11.1% | Ball-milled to <40 mesh | 1.7 | 233.3 | 12.9 | .350 |
| 60 | MAP(5): 55.6% | Cyanoguanidine: 22.2% | Sugar-Conf.: 11.1% | 11.1% | 900 g batch $H_2O$ granulated | 2.9 | 902.9 | 49.9 | .810 |
| 61 | MAP(5): 55.6% | Cyanoguanidine: 22.2% | Sugar-Conf.: 11.1% | 11.1% | Barrel mixer on Sample 56 | 2.6 | 998.5 | 55.2 | .910 |
| 62 | MAP(5): 55.6% | UREA: 22.2% | Sugar-Conf.: 11.1% | 11.1% | — | 3.9 | 2134.3 | 117.9 | .650 |
| 63 | MAP(5): 55.6% | Cyanoguanidine: 22.2% | Sugar-Conf.: 11.1% | 11.1% | 3.6 Kg batch | 2.9 | 1145.5 | 63.3 | .720 |
| 64 | MAP(6): 55.6% | Cyanoguanidine: 22.2% | Sugar-Conf.: 11.1% | 11.1% | — | 2.4 | 728.4 | 40.2 | .700 |
| 65 | Commercial Product No. 1 | — | — | — | — | 2.6 | 146.7 | 8.1 | .300 |
| 66 | Commercial Product No. 2 ($NaHCO_3$-FE Powder) | — | — | — | — | None | 31.1 | 1.7 | None |
| 67 | Commercial Product No. 3 | Al[$(NH_4)HPO_4$]3 | — | — | — | None | 33.7 | 1.9 | None |

(1) DAP —Diammonium Phosphate, reagent crystals, MCB AX-1355
(2) DPE —Dipentaerythritol, Trojan Chemical Company
(3) PE —Pentaerythritol, m.p. 254°C, min., MCB PX-145
(4) TPE —Tripentaerythritol, Trojan Chemical Company
(5) MAP —Monoammonium Phosphate, reagent, crystals, MCB AX-1350
(6) MAP —Monoammonium Phosphate, purified, granular, MCB AX-1351

Later experiments indicate that certain members of the fully reduced sugars, hexanehexols, add exceptional, unexpected intumescent properties to the 5:2:1:1 ratio of ingredients in Sample 49. For example, the addition of one part mannitol (m.p. 166°C.) to Sample 49 doubled the resultant foam height and created a soft, resilient, black foam. Data for IF values could not be determined via the 2'-tunnel, because the equipment had been disassembled. The increased foam height and early initial intumescence was also evidenced when mannitol was substituted for confectioners sugar on a 1:1 basis. Mannitol was the most effective probably because of the proximity of the melting point to the decomposition point of MAP, but unexpected improvement was also noted in such widely melting materials as sorbitol (m.p. 110°C.), and dulcitol (m.p. 188.5°C.). The intumescent effectiveness of these two divergent melting hexanehexols may be attributed to the fully reduced state of the molecule which facilitated the phosphate esterification reaction on the polyol. The incorporation of all available hexanehexols as a class has not been completely investigated, but the increased foam height in all samples is attributed to the viscous, fluid melt on the initial intumescence of the dry-powder.

The primary objective was the development of a low-cost, water suspensible, sprayable, phosphate-based, temporary intumescent coating. Having developed the unique formulation of dry-powder ingredients in Sample 49, we directed our efforts toward the second phase of this project. It is our opinion that an acceptable aqueous intumescent suspension should contain the following criteria:

1. Contain at least 50 to 75 percent total solids, most of which is capable of intumescence;
2. The suspension should be easily prepared with a minimum of agitation from a complete dry-powder mixture added to water;
3. The suspension should be applicable to the threatened site in a very short period of time;
4. The suspension should encompass wide parameters of thixotropy and be capable of leveling to a smooth, homogeneous coating which adheres to surfaces including inclined surfaces;
5. The sprayed coating should dry to a desiccated condition capable of resisting minor abrasions;
6. The desiccated coating should remain intact, fully capable of intumescent protection, for an indefinite period of time;
7. The desiccated or freshly applied coating, whether the intumescent char or the undeveloped coating, should be easily removed by minimal aqueous scrubbing;
8. The aqueous suspension should exhibit uniform solids distribution throughout the system for at least 1–2 months;
9. After achieving all the product parameters listed above, the system should have a low cost per square foot of area covered.

For the successful incorporation of dry-powder Sample 49, which contained MAP:cyanoguanidine:confectioners sugar:titanium-dioxide (5:2:1:1), into an aqueous suspension encompassing all the previous product parameters; a number of separate experiments were carried out. In the formulation prepared, we have achieved the original product goals by:

1. The aqueous suspension contains 67 percent by weight total solids;
2. The aqueous suspension was prepared by adding the solids to the water, and agitating 15 minutes with a 4-bladed impeller at a minimum aeration level. The initial viscosity of 6,000 cps reached a maximum of 14,800 cps in 3 days (Brookfield LVF, spindle No. 5 at 10 rpm).
3. The sample exhibited remarkable intumescent qualities on a wooden test panel immediately following the initial viscosity measurement. The suspension is capable of being sprayed from a pressurized system when the product viscosity is maintained between 6,000 and 20,000 cps.
4.–8. Maximum viscosity levels are reached in 1–24 hours depending on the amount of gelling agent in the premix and the degree of thixotropy that the pressure equipment is capable of administering. The freshly applied suspension will desiccate to a tough abrasion resistant coating in approximately 20–30 minutes at 70 percent relative humidity on a wooden test panel. We have samples that have shown uniform solids distribution for 4.5 weeks.
9. A 20–28 mil coating sprayed from the aqueous suspension is required to effectively protect such varied surfaces as glass, paper, wood, metal and polyethylene bottles.

The water suspension formulations are illustrated by the following example:

SAMPLE 68

The best dry powder mix, namely Sample 49, was formulated into an aqueous suspension as follows:

|  | grams | parts |
|---|---|---|
| Monoammonium phosphate | 111.10 | 5 |
| Cyanoguanidine | 44.44 | 2 |
| Sugar, powdered | 22.22 | 1 |
| Titanium dioxide | 22.22 | 1 |
| Dry powder mix | 200.00 | |
| *Cellosize:CMC-P-75-XH Union Carbide - Lot No. 5007XX | 3.00 | |
| Water | 100.00 (ml) | |
| | 303.00 | |

*This is a commercial carboxymethyl cellulose wetting agent.

Procedure: The dry powder mix and cellosize were mixed on a roll mill for 15 minutes, and these dry ingredients were then added to the water with stirring and the stirring was continued for 1 hour to thoroughly mix the dry ingredients with water. A stable suspension of the dry ingredients in the water resulted which showed no separation overnight, and a Brookfield Viscosity (RVF) - Spindle No. 5 at 20 rpm = 10,500 cps. A spatula was dipped into the aqueous suspension, the spatula was allowed to drain in a vertical position and then allowed to dry in the air overnight in a horizontal position. The dried film was tough, homogeneous surface which resisted abrasion by thumb. The coating on the spatula tightly adhered to the metal spatula yet readily washed off with water. When the coated spatula was held in a flame a thick intumescent coating bloomed on the spatula.

The effectiveness of our intumescent coatings has been documented and recorded for visual analysis via 35-mm Kodacolor slides and video-tape recordings. The following examples demonstrate the superiority of the formulations:

TEST CONDITIONS a. Test panels were held vertically, five inches from the torch nozzle with the flame impingement directed toward the center of each panel.

b. Fuel: (Type B, manufactured cylinder gas), no oxygen premix, flame front temperatures registered 400°–550°C.

c. Back-face temperatures of test panels were recorded when the test panel composition lent itself to this type of measurement.

d. Exposure of coated and uncoated surfaces varied from 5 to 15 minutes. Exposure times are noted for each example.

e. Uncoated or control panels were evaluated only when the material was sufficiently fire-resistant to preclude a major fire hazard in our test facilities.

f. Panels were coated with our aqueous intumescent formulations from portable pressurized spray equipment. The dried coating on each test panel varied in thickness from 20 to 28 mils.

TEST PANELS

1. Three-layered, corrugated boxboard, size: 13 inches × 16 inches × ¼ inch a. After five minutes exposure to the test flame, the panel had a visible ½ inch circular scorch mark on the back-face panel. There was little visible smoke and no acrid odor detected during the testing period. The panel was flushed completely free of all surface coating with tap water and light scrubbing with a brush. The only visible signs of damage on the front-face surface was an irregular pear-shaped char and surface cracking at the locus of the flame impingement.

b. Control panel: not tested due to high fire hazard in test area.

2. Plywood subflooring, grade CD, size: 13 inches × 16 inches × 0.450 inch a. After 5 minutes exposure to flame impingement only a very slight scorch mark altered the surface of the test panel. No smoke or odor detected during test period. No structural damage and scorch mark could be removed by light sanding.

b. Control panel: Flame impingement removed after 3 minutes due to the severity of the fire, accompanied by black smoke and strong pungent odors. Panel severely burned and extensive structural damage.

3. Steel plate, cold-rolled, 13 inches × 16 inches × 0.031 inch, front-face surface spray-painted with gloss white enamel (0.002–0.005 inch thick)

a. Coated panel: test period = 5 minutes, front-face temperature ~550°C. (1022°F.). Back-face temperatures recorded at center of fire impingement area.

1. 1 minute: 204°F. coating intumesced at impingement point.
2 minute: 234°F.
3 minute: 242°F. maximum "bloom" of coating at fire impingement center
4 minute: 246°F.
5 minute: 221°F. (note that back-face temperature dropped)

2. The cleansed test panel exhibited only slight discoloration and a superficial blistering of the paint surface at the flame center. No smoke or acrid odors during the test period.

b. Control panel: The back-face temperature reached 400°F in 18–20 seconds. The painted front-face surface was completely destroyed and badly blistered at the flame front center of impingement. This surface degradation was accompanied by smoke and acrid odors during the test period.

4. HIGH DENSITY POLYETHYLENE BOTTLE, SIZE 4 INCHES × 6½ INCHES × 2½ INCHES a. Coated container: 5 minute test period. No smoke or acrid odors. The container remained completely intact with only the front-face section collapsed and distorted.

b. Control container: The flame was removed after a 35-second test period. The flame front was spreading and polymer drippage was extensive. A hole was completely eroded through the front-face surface and some warping and distortion of the back-free surface was evident. There was a considerable amount of black smoke considering the short test period.

From an examination of the experimental data it can be predicted that the compositions to provide optimum protection against heat and fire will include on a dry basis.

a. monoammonium phosphate, diammonium phosphate or mixtures thereof in an amount in the range of about 50 to 60 percent by weight;
b. cyanoguanidine, urea or mixtures thereof an amount in the range of about 18 to 25 percent by weight;
c. sucrose in an amount in the range of 10 to 15 percent by weight, and
d. titanium dioxide in an amount in the range of about 5 to 20 percent by weight.

The optimum compositions are set forth in the preceding paragraph and the fact they are compositions giving superior protection from fire is supported by the experimental data and the Figure. If less fire protection can be tolerated, certain other materials can be substituted for all or part of some of the ingredients of the optimum compositions; however, these substituted ingredients should not prevent the coating from being washed off the substrates either before or after intumescence and they should not cause the coatings to become smoke producing. For example, partial or complete substitution of one of the other phosphoric acid or boric acid compounds of the two prior art patents discussed hereinabove for the monoammonium phosphate and diammonium phosphate of the claimed compositions of the present invention is possible, e.g. triammonium phosphate with a water-soluble phosphate being preferred.

Also other amine compounds than cyanoguanidine and urea may be usable as a partial or complete replacement of these two such as the ones mentioned in U.S. Pat. No. 3,513,114, namely melamine and dimethyl urea.

It should be further noted that foam height but not insulative factor tests carried out on mannitol, sorbitol and dulcitol indicated that a part or all of the sucrose might be replaceable in the compositions of the invention and yet obtain optimum heat- and fireproofing. Also, if optimum fire protection is not required, other polyols mentioned in U.S. Pat. No. 3,513,114 may be used, e.g. a pentaerythritol, glucose, or the like with or in place of sucrose.

The titanium dioxide in the compositions of the invention can be replaced with other well known heat-reflective compounds such as antimony oxide, zirconium oxide and the like.

In the aqueous compositions of the invention other dispersing agents than carboxymethyl cellulose may be usable although this particular dispersant gave stable suspensions for the longest time of any of those tested.

In summary it can be said that the art has not appreciated the value of temporary heat- and fireproofing coatings on substrates especially those which are removable by water washing and scrubbing both before and after exposure of the coated substrate to heat, nor has the art appreciated the markedly superior heat- and fireproofing compositions developed as a part of this invention. The art teaches either compositions to be applied to a fire such as in U.S. Pat. No. 2,901,428 or permanent coatings such as described in U.S. Pat. No. 3,513,114.

Although the invention has been described in terms of specified embodiments which are set forth in considerable detail, it should be understood that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A substrate coated with a water-removable intumescent heat-and-fire-froofing composition comprising monoammonium phosphate, diammonium phosphate or mixtures thereof as the ammonium phosphate in an amount in the range of about 50 to 60 percent by weight, cyanoguanidine, urea or mixtures thereof as the amine compound in an amount in the range of about 18 to 25 percent by weight; sucrose or sucrose + a hexanehexol as the polyhydric compound in an amount in the range of about 10 to 15 percent by weight; and, titanium dioxide as the heat reflecting substance in an amount in the range of about 5 to 20 percent by weight.

2. A coated substrate of claim 1 wherein the coating comprises monoammonium phosphate as ammonium phosphate, cyanoguanidine as the amine compound, sucrose as the polyhydric compound and titanium dioxide as the heat reflecting substance.

3. A coated substrate of claim 1 wherein mannitol is the hexanehexol.

4. An intumescent heat- and fireproofing composition consisting essentially of
   a. monoammonium phosphate, diammonium phosphate, or mixtures thereof as a heat- and fireproofing agent in an amount in the range of about 50 to 60 percent by weight;
   b. cyanoguanidine, urea or mixtures thereof to promote intumescence in an amount in the range of about 18 to 25 percent by weight;
   c. sucrose or sucrose + a hexanehexol in sufficient amount together with the phosphate to promote initial intumescence at low temperature in an amount in the range of about 10 to 15 percent by weight, and
   d. titanium dioxide as a heat-reflecting agent in an amount in the range of about 5 to 20 percent by weight.

5. A composition of claim 4 consisting essentially of monoammonium phosphate, cyanoguanidine, sucrose and titanium dioxide.

6. A composition of claim 4 consisting essentially of monoammonium phosphate, urea, sucrose and titanium dioxide.

7. A composition of claim 4 wherein said hexanehexol is mannitol.

8. A composition of claim 4 consisting essentially of diammonium phosphate, cyanoguanidine, sucrose and titanium dioxide.

9. An aqueous suspension of a composition of claim 5.

10. An aqueous suspension of a composition of claim 9.

* * * * *

UNITED STATES PATENT OFFICE
CERTIFICATE OF CORRECTION

PATENT NO. : 3,955,987
DATED : May 11, 1976
INVENTOR(S) : John L. Schaar, James A. Ellard and John Mann Butler It is certified that error appears in the above-identified patent and that said Letters Patent are hereby corrected as shown below:

Columns 7 and 8, Table I, Sample 1, under "Foam Height inches" insert --- .225 ---.

Columns 9 and 10, Sample 51, under "TITANIUM DIOXIDE", insert --- % --- after "11.1".

Column 15, line 25, claim 1, change "-froofing" to --- -proofing ---.

Column 16, line 37, in claim 10, "9" should be changed to --- 7 ---.

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*